(12) United States Patent
Zang et al.

(10) Patent No.: US 10,859,876 B2
(45) Date of Patent: Dec. 8, 2020

(54) DISPLAY PANEL, METHOD FOR FABRICATING THE SAME AND DISPLAY DEVICE

(71) Applicants: BOE Technology Group Co., Ltd., Beijing (CN); Hefei BOE Optoelectronics Technology Co., Ltd., Anhui (CN)

(72) Inventors: Yuansheng Zang, Beijing (CN); Huizi Li, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 16/123,311

(22) Filed: Sep. 6, 2018

(65) Prior Publication Data
US 2019/0094584 A1    Mar. 28, 2019

(30) Foreign Application Priority Data
Sep. 26, 2017    (CN) .......................... 2017 1 0884781

(51) Int. Cl.
*G02F 1/1341* (2006.01)
*G02F 1/1339* (2006.01)
*G02F 1/1333* (2006.01)
*G02F 1/1337* (2006.01)
(Continued)

(52) U.S. Cl.
CPC .......... *G02F 1/1339* (2013.01); *G02F 1/1337* (2013.01); *G02F 1/1341* (2013.01); *G02F 1/133308* (2013.01); *G02F 1/133516* (2013.01); *G02F 2001/133311* (2013.01); *H01L 51/5246* (2013.01)

(58) Field of Classification Search
None
See application file for complete search history.

(56) References Cited

U.S. PATENT DOCUMENTS 6,337,727 B1 * 1/2002 Ono .................. G02F 1/133512
                                                        349/110
6,357,763 B2 * 3/2002 Mathew ................ G02F 1/1339
                                                        277/628
(Continued)

FOREIGN PATENT DOCUMENTS

CN          1526643 A      9/2004
CN       101561591 A     10/2009
(Continued)

OTHER PUBLICATIONS

Corresponding Chinese Application 201710884781.9 Office Action dated Nov. 11, 2019.
(Continued)

*Primary Examiner* — Phu Vu
(74) *Attorney, Agent, or Firm* — Arent Fox LLP; Michael Fainberg

(57) ABSTRACT

The disclosure discloses a display panel, a method for fabricating the same, and a display device, and the display panel includes a first substrate and a second substrate arranged opposite to each other, wherein the display panel further includes an isolation layer, and the isolation layer, the first substrate, and the second substrate define together a sealed chamber.

18 Claims, 2 Drawing Sheets

(51) Int. Cl.
G02F 1/1335 (2006.01)
H01L 51/52 (2006.01)

(56) References Cited

U.S. PATENT DOCUMENTS

| | | | |
|---|---|---|---|
| 7,724,341 B2* | 5/2010 | Kondo | G02F 1/1339 349/153 |
| 2006/0197901 A1* | 9/2006 | Liu | G02F 1/13394 349/153 |
| 2013/0033664 A1* | 2/2013 | Lee | C09J 9/02 349/106 |
| 2018/0231834 A1 | 8/2018 | Chen et al. | |

FOREIGN PATENT DOCUMENTS

| | | |
|---|---|---|
| CN | 105676491 A | 6/2016 |
| CN | 106270500 A | 1/2017 |
| CN | 106526958 A | 3/2017 |
| CN | 106873253 A | 6/2017 |

OTHER PUBLICATIONS

Corresponding Chinese Application 201710884781.9 Office Action dated May 13, 2020.

\* cited by examiner

DISPLAY PANEL, METHOD FOR FABRICATING THE SAME AND DISPLAY DEVICE

CROSS-REFERENCE TO RELATED APPLICATION

This Application claims priority to Chinese Patent Application No. 201710884781.9, filed on Sep. 26, 2017, the content of which is incorporated by reference in the entirety.

TECHNICAL FIELD

This disclosure relates to the field of display technologies, and particularly to a display panel, a method for fabricating the same and a display device.

DESCRIPTION OF THE RELATED ART

In the field of display technologies, a Thin Film Transistor Liquid Crystal Display (TFT-LCD) and particularly a TFT-LCD with a high PPI (Pixels Per Inch) has become predominate in the market of displays due to its small volume, low power consumption, no radiation, and other advantages. Among the processes of fabricating a TFT-LCD, an optical alignment process for forming a TFT-LCD with a high PPI has become predominant in place of a rubbing alignment process.

In the related art, for a TFT-LCD fabricated via the optical alignment process, a Polyimide (PI) film for optical alignment is sensitive to water vapor, and the water vapor may be absorbed by a PI layer through a frame sealant, or enter a display panel directly through the PI layer, a protection layer, a Black Matrix (BM), or another interface in a high-temperature and high-humidity environment, thus resulting in abnormal alignment of the PI layer, and hindering surrounding liquid crystals from being deflected. And particularly when the PI layer is charged, the PI layer absorbing the water vapor may be aligned abnormally, so some elements of an image may be displayed in an excessively white or black mode, and visually appear as an excessively white or black mode in a peripheral area of the display panel, thus resulting in a frame Mura phenomenon, and seriously degrading the quality of the image, and the experience of a user.

SUMMARY

Embodiments of the disclosure provide a display panel, a method for fabricating the same and a display device.

In one aspect, the embodiments of the disclosure provide a display panel including: a first substrate, a second substrate arranged opposite to the first substrate, and an isolation layer; wherein the isolation layer, the first substrate, and the second substrate define together a sealed chamber.

In some embodiments, the display panel further includes a frame sealant arranged between the first substrate and the second substrate; wherein the isolation layer is arranged outside of an outer side surface of the frame sealant, and defines the sealed chamber together with the first substrate and the second substrate.

In some embodiments, the isolation layer contacts with the outer side surface of the frame sealant.

In some embodiments, the isolation layer extends and dads a surface of the first substrate facing away from the frame sealant, and/or the isolation layer extends and dads a surface of the second substrate facing away from the frame sealant.

In some embodiments, an orthographic projection of a part of the isolation layer, located on the surface of the first substrate facing away from the frame sealant, onto the first substrate lies in an orthographic projection of the frame sealant onto the first substrate; and/or an orthographic projection of a part of the isolation layer, located on the surface of the second substrate facing away from the frame sealant, onto the second substrate lies in an orthographic projection of the frame sealant onto the second substrate.

In some embodiments, a material of the isolation layer includes silver.

In some embodiments, a thickness of the isolation layer ranges from 0.15 µm to 10 µm.

In some embodiments, the thickness of the isolation layer ranges from 0.15 µm to 3 µm.

In another aspect, the embodiments of the disclosure provide a display device including a display panel, wherein the display panel includes: a first substrate, a second substrate arranged opposite to the first substrate, and an isolation layer; wherein the isolation layer, the first substrate, and the second substrate define together a sealed chamber.

In some embodiments, the display panel further includes a frame sealant arranged between the first substrate and the second substrate, wherein the isolation layer is arranged outside of an outer side surface of the frame sealant, and defines the sealed chamber together with the first substrate and the second substrate.

In some embodiments, the isolation layer contacts with the outer side surface of the frame sealant.

In some embodiments, the isolation layer extends and dads a surface of the first substrate facing away from the frame sealant, and/or the isolation layer extends and dads a surface of the second substrate facing away from the frame sealant.

In some embodiments, an orthographic projection of a part of the isolation layer, located on the surface of the first substrate facing away from the frame sealant, onto the first substrate lies in an orthographic projection of the frame sealant onto the first substrate; and/or an orthographic projection of a part of the isolation layer, located on the surface of the second substrate facing away from the frame sealant, onto the second substrate lies in an orthographic projection of the frame sealant onto the second substrate.

In some embodiments, a material of the isolation layer includes silver.

In some embodiments, a thickness of the isolation layer ranges from 0.15 µm to 10 µm.

In some embodiments, the thickness of the isolation layer ranges from 0.15 µm to 3 µm.

In still another aspect, the embodiments of the disclosure provide a method for fabricating the display panel according to the embodiments of the disclosure, the method includes: box-aligning the first substrate with the second substrate; forming a chemical solution for plating the isolation layer; and plating the chemical solution onto the first substrate and the second substrate, which are arranged opposite to each other, to form the isolation layer; wherein the isolation layer, the first substrate, and the second substrate define together the sealed chamber.

In some embodiments, box-aligning the first substrate with the second substrate includes: coating the frame sealant on the first substrate; dropping liquid crystals on the second substrate; and box-aligning the first substrate with the second substrate, and curing the frame sealant.

In some embodiments, the chemical solution includes a silver-ammonia complex solution and a reducing agent solution; and forming the chemical solution for plating the isolation layer includes: adding an ammonium hydroxide to a silver nitrate solution to form a silver oxide precipitation; adding the ammonium hydroxide to the silver nitrate solution continually to form the silver-ammonia complex solution; adding a hydrazine sulfate to distilled water to form a hydrazine sulfate solution; and adding a sodium hydroxide to the hydrazine sulfate solution to form the reducing agent solution.

In some embodiments, plating the chemical solution onto the first substrate and the second substrate, which are arranged opposite to each other, to form the isolation layer includes: forming a protection layer in a non-plating area of the display panel; spraying the reducing agent solution and the silver-ammonia complex solution onto sides of the first substrate and the second substrate, which are arranged opposite to each other, to form the isolation layer; and removing the protection layer after the plating is finished.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

The technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those ordinarily skilled in the art without any inventive effort shall fall into the claimed scope of the disclosure.

Figure 1:
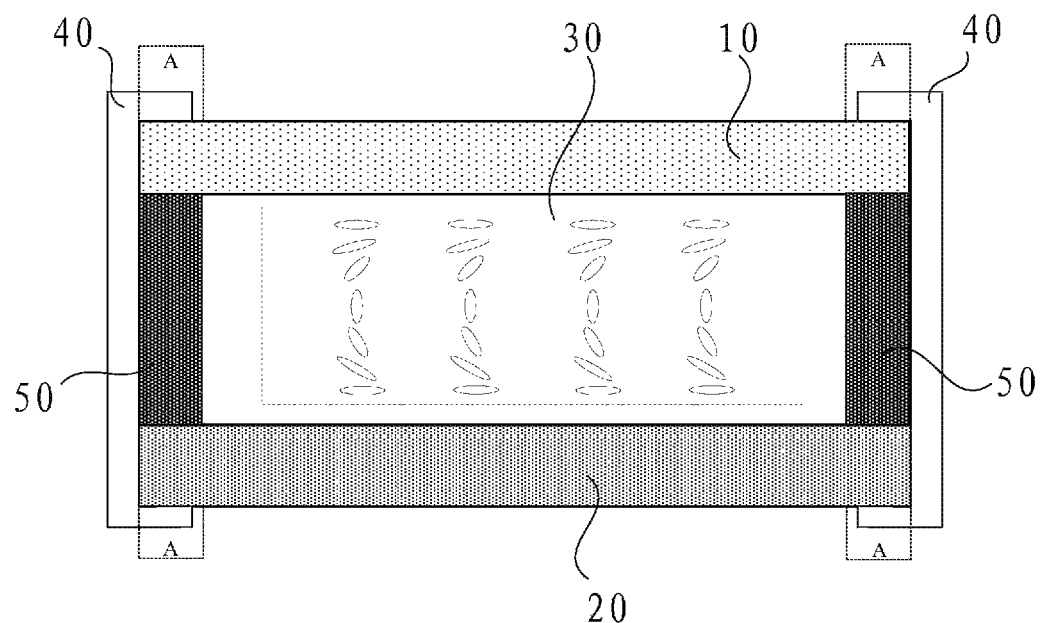
FIG. 1 is a schematic structural diagram of a display panel according to the embodiments of the disclosure.

As illustrated in FIG. 1, a display panel according to the embodiments of the disclosure includes a first substrate 10 and a second substrate 20 arranged opposite to each other, and further includes an isolation layer 40; where the isolation layer 40, the first substrate 10 and the second substrate 20 define together a sealed chamber.

In the display panel above according to the embodiments of the disclosure, the isolation layer 40, the first substrate 10 and the second substrate 20 define together the sealed chamber which can prevent the water vapor and other substances outside the sealed chamber from entering the sealed chamber, and also prevent substances inside the sealed chamber from being leaked out of the sealed chamber, so the sealed chamber can seal elements located in the sealed chamber to isolate the water vapor, so as to avoid the water vapor from entering the sealed chamber and thus affecting a PI layer, and further avoid deflection of liquid crystals from being affected. Accordingly a frame Mura phenomenon of the display panel can be alleviated to thereby improve the quality of an image displayed on the display panel, and the experience of a user thereof.

In some embodiments, as illustrated in FIG. 1, the first substrate 10 is a color filter substrate, and the second substrate 20 is an array substrate; or the first substrate 10 is an array substrate, and the second substrate 20 is a color filter substrate.

In some embodiments, when the display panel above is a display panel of a TFT-LCD, the first substrate 10 and the second substrate 20 are an array substrate and a color filter substrate, for example, the first substrate 10 is a color filter substrate, and the second substrate 20 is an array substrate, or the first substrate 10 is an array substrate, and the second substrate 20 is a color filter substrate.

In some embodiments, when the display panel above is a display panel of an Organic Light-Emitting Diode (OLED) display panel, the first substrate 10 and the second substrate 20 are an OLED substrate and a display cover plate, for example, the first substrate 10 is an OLED substrate, and the second substrate 20 is a display cover plate, or the first substrate 10 is a display cover plate, and the second substrate 20 is an OLED substrate.

Further to the display panel above, in some embodiments, as illustrated in FIG. 1, the display panel further includes a frame sealant 50 arranged between the first substrate 10 and the second substrate 20, where: the isolation layer 40 is arranged outside of an outer side surface of the frame sealant 50, and defines the sealed chamber together with the first substrate 10 and the second substrate 20.

The display panel above will be further described as follows by being taken as a display panel of a TFT-LCD, where the first substrate 10 is a color filter substrate, and the second substrate 20 is an array substrate.

Figure 2:
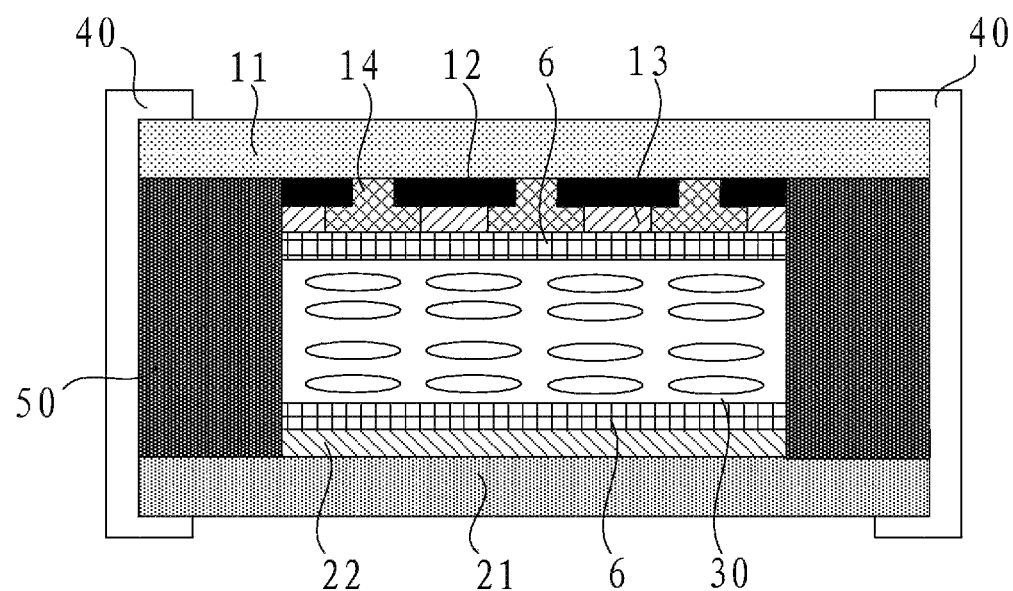
FIG. 2 is another schematic structural diagram of a display panel according to the embodiments of the disclosure.

As illustrated in FIG. 2, the display panel further includes a liquid crystal layer 30, two PI layers 6, and the frame sealant 50, arranged between a color filter substrate and an array substrate.

Where the color filter substrate includes a first base substrate 11, and black matrixes 12, a color filter film 14, a planarization layer 13, and a PI layer 6, formed on the first base substrate 11 in that order; the array substrate includes a second base substrate 21, and a TFT element layer 22 and another PI layer 6 formed on the second base substrate 21 in that order; and the isolation layer 40 is arranged outside of an outer side surface of the frame sealant 50, and defines a sealed chamber together with the first base substrate 11 and the second base substrate 21, so that the isolation layer 40, the first substrate 10 and the second substrate 20 define a sealed chamber.

Where the frame sealant 50 includes two surfaces in contact with the first base substrate 11 and the second base substrate 21, and the outer side surface of the frame sealant 50 refers to a side surface which faces away from the liquid crystal layer 30 and connects the two surfaces in contact with the substrates of the frame sealant 50.

In the display panel above, the isolation layer 40 is arranged outside of the outer side surface of the frame sealant 50, and defines together with the first base substrate 11 and the second base substrate 21 the sealed chamber, so the water vapor can be isolated out of the sealed chamber instead of passing through and enter the sealed chamber, so that less water vapor can be absorbed by the PI layers 6 through the frame sealant 50, or enter the display panel directly through the PI layers 6, the planarization layer 13, the black matrixes 12, or another interface, and thus the PI layers 6 can be alleviated from being aligned abnormally, to thereby alleviate deflection of liquid crystals from being affected, so as to alleviate the frame Mura phenomenon of the display panel, thus improving the quality of an image displayed on the display panel, and the experience of a user thereof.

Further, the sealed chamber can reduce the amount of water vapor entering the display panel to thereby alleviate the TFT element layer 20, the color filter film 14, and other elements from being affected by the water vapor, so as to prolong the service lifetime of the respective elements in the display panel, thus improving the operating performance and the service lifetime of the display panel.

Further to the display panel above in which the fame Mura phenomenon can be alleviated to thereby improve the quality of an image displayed on the display panel, and the experience of a user thereof, in order to further alleviate the PI layers 6 from being affected by the water vapor, in some embodiments, as illustrated in FIG. 1 and FIG. 2, the isolation layer 40 contacts with the outer side surface of the frame sealant 50.

In the display panel above, the isolation layer 40 can contact with the outer side surface of the frame sealant 50, or a gap between the isolation layer 40 and the frame sealant 50 can be narrowed within some range, or a space between the isolation layer 40 and the frame sealant 50 can be vacuumized so that residual or emerging water vapor in the space between the isolation layer 40 and the frame sealant 50 can be avoided from being absorbed by the PI layers 6 through the frame sealant 50, or entering the display panel directly through the PI layers 6, the planarization layer 13, the black matrixes 12, or another interface, and thus the PI layers 6 can be alleviated from being aligned abnormally, to thereby alleviate deflection of liquid crystals from being affected, so as to alleviate the frame Mura phenomenon of the display panel, thus improving the quality of an image displayed on the display panel, and the experience of a user thereof.

Further to the display panel above in which the frame Mura phenomenon can be alleviated to thereby improve the quality of an image displayed on the display panel, and the experience of a user thereof, in order to further alleviate the PI layers 6 from being affected by the water vapor, as illustrated in FIG. 1 and FIG. 2, in some embodiments, the isolation layer 40 extends and dads a surface of the first substrate 10 facing away from the frame sealant 50, and/or the isolation layer 40 extends and dads a surface of the second substrate 20 facing away from the frame sealant 50.

That is, the isolation layer 40 can be arranged outside of the outer side surface of the frame sealant 5 in one of the following implementations.

In a first implementation, the isolation layer 40 extends and dads the surface of the first substrate 10 facing away from the frame sealant 50, and the isolation layer 40 is flush with the surface of the second substrate 20 facing away from the frame sealant 50.

In a second implementation, the isolation layer 40 extends and dads the surface of the second substrate 20 facing away from the frame sealant 50, and the isolation layer 40 is flush with the surface of the first substrate 10 facing away from the frame sealant 50.

In a third implementation, as illustrated in FIG. 1, the isolation layer 40 extends and dads the surface of the first substrate 10 facing away from the frame sealant 50, and the isolation layer 40 extends and dads the surface of the second substrate 20 facing away from the frame sealant 50.

In the display panel above, the isolation layer 40 is arranged outside of the outer side surface of the frame sealant 50, and the isolation layer 40 extends and dads the surface(s) of the first substrate 10 and/or the second substrate 20 facing away from the frame sealant 50 to thereby further reduce the amount of water vapor entering the sealed chamber.

As illustrated in FIG. 1, further to the display panel above in which the isolation layer 40 is arranged outside of the outer side surface of the frame sealant 50, in order to avoid a display effect from being affected by the isolation layer, the isolation layer 40 is located in a non-display area A of the display panel. In some embodiments, an orthographic projection of a part of the isolation layer 40, located on the surface of the first substrate 10 facing away from the frame sealant 50, onto the first substrate 10 lies in an orthographic projection of the frame sealant 50 onto the first substrate 10; and/or an orthographic projection of a part of the isolation layer 40, located on the surface of the second substrate 20 facing away from the frame sealant 50, onto the second substrate 20 lies in an orthographic projection of the frame sealant 50 onto the second substrate 20.

That is, in the display panel above, the isolation layer 40 can be arranged outside of the outer side surface of the frame sealant 5 in one of the following implementations.

In a first implementation, the orthographic projection of the part of the isolation layer 40, located on the surface of the first substrate 10 facing away from the frame sealant 50, onto the first substrate 10 lies in the orthographic projection of the frame sealant 50 onto the first substrate 10, and the isolation layer 40 is flush with the surface of the second substrate 20 facing away from the frame sealant 50.

In a second implementation, the orthographic projection of the part of the isolation layer 40, located on the surface of the second substrate 20 facing away from the frame sealant 50, onto the second substrate 20 lies in the orthographic projection of the frame sealant 50 onto the second substrate 20, and the isolation layer 40 is flush with the surface of the first substrate 10 facing away from the frame sealant 50.

In a third implementation, as illustrated in FIG. 1, the orthographic projection of the part of the isolation layer 40, located on the surface of the first substrate 10 facing away from the frame sealant 50, onto the first substrate 10 lies in the orthographic projection of the frame sealant 50 onto the first substrate 10; and the orthographic projection of the part of the isolation layer 40, located on the surface of the second substrate 20 facing away from the frame sealant 50, onto the second substrate 20 lies in the orthographic projection of the frame sealant 50 onto the second substrate 20.

In some embodiments, the isolation layer 40 is made of a metal material, which can be selected from silver, copper, nickel, gold, and other metal. Further, it shall be noted that, the isolation layer 40 can be made of another material, dependent upon the practical situation of the display panel.

In some embodiments, a thickness of the isolation layer 40 ranges from 0.15 µm to 10 µm.

In some embodiments, the thickness of the isolation layer 40 ranges from 0.15 µm to 3 µm.

For example, in the display panel above, the thickness of the isolation layer 40 can be 0.10 µm, 0.15 µm, 0.45 µm, 0.6 µm, 0.75 µm, 0.9 µm, 1.05 µm, 1.105 µm, 1.2 µm, 1.5 µm, 1.65 µm, 1.8 µm, 1.95 µm, 2.1 µm, 2.25 µm, 2.4 µm, 2.55 µm, 2.7 µm, 2.85 µm, 3 µm, or 10 µm. Further, it shall be noted that, the thickness of the isolation layer 40 can be set flexibly according to the practical situation of the display panel.

Based upon a same inventive concept, the embodiments of the disclosure further provide a display device including the display panel above according to the embodiments of the disclosure. Since the display device address the problem using a similar principle with the display panel above, reference can be made to the embodiments of the display panel above for an implementation of the display device, so a repeated description thereof will be omitted here.

In the display device above, the display panel included in the display device can alleviate the frame Mura phenomenon, and improve the quality of an image displayed on the display panel, and the experience of a user thereof, so the display panel including the display panel above can have a high quality of an image, and a friendly experience of a user.

Figure 3:
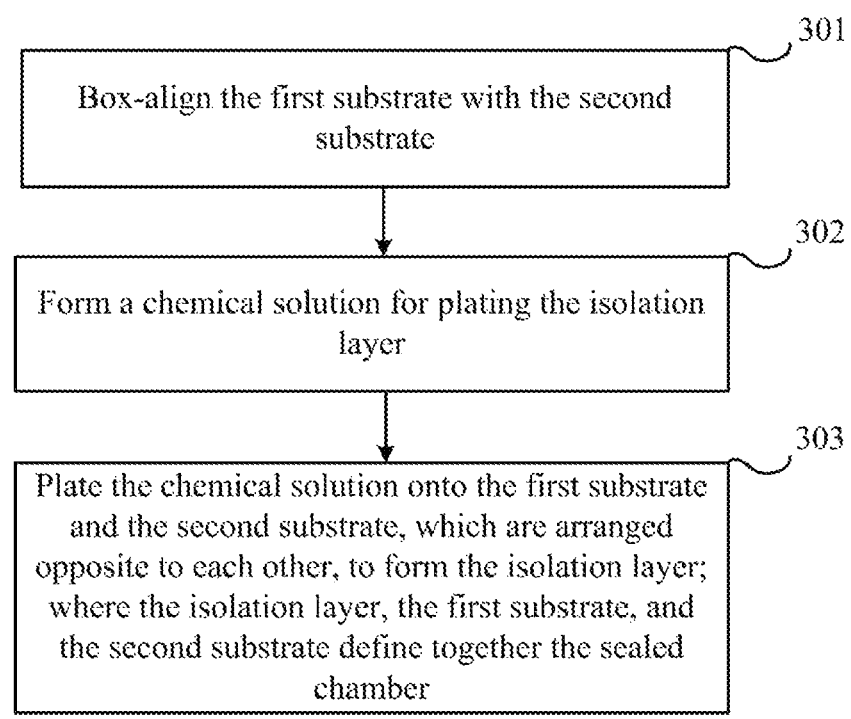
FIG. 3 is a flow chart of a method for fabricating a display panel according to the embodiments of the disclosure.

As illustrated in FIG. 3, based upon a same inventive concept, the embodiments of the disclosure further provide a method for fabricating the display panel above according to the embodiments of the disclosure, where the method includes following operations.

The operation S301 is to box-align the first substrate 10 with the second substrate 20.

The operation S302 is to form a chemical solution for plating the isolation layer 40.

The operation S303 is to plate the chemical solution onto the first substrate 10 and the second substrate 20, which are arranged opposite to each other, to form the isolation layer 40; where the isolation layer 40, the first substrate 10, and the second substrate 20 define together a sealed chamber.

In the method above for fabricating the display panel, the isolation layer 40 is fabricated through a chemical film plating process, and the isolation layer 40, the first substrate 10, and the second substrate 20 define together the sealed chamber. In the operation S301, the first substrate 10 is box-aligned with the second substrate 20; in the operation S302, the chemical solution is formed to chemically plate the isolation layer 40; and then in the operation S303, the chemical solution is plated on sides of the first substrate 10 and the second substrate 20, which are arranged opposite to each other, to form the isolation layer 40, where the isolation layer 40, the first substrate 10, and the second substrate 20 define together the sealed chamber. The method above for fabricating the display panel is simple in operation, and convenient to perform.

Further to the method above for fabricating the display panel, in some embodiments, box-aligning the first substrate 10 with the second substrate 20 includes following operations.

Coating the frame sealant 50 on the first substrate 10; dropping liquid crystals on the second substrate 20; box-aligning the first substrate 10 with the second substrate 20, and curing the frame sealant 50.

The process of box-aligning the first substrate 10 with the second substrate 20 will be described below by way of an example in which the display panel is a TFT-LCD display panel as illustrated in FIG. 2, where the first substrate 10 is a color filter substrate, and the second substrate 20 is an array substrate. The process of box-aligning the first substrate 10 with the second substrate 20 includes following operations.

Forming the TFT element layer 22 above the second base substrate 21.

Forming the black matrixes 12, the color filter film 14, and the planarization layer 13 above the first base substrate 11 in that order.

Forming the PI layers 6 above a surface of the TFT element layer 22 facing away from the second base substrate 21, and a surface of the planarization layer 13 facing away from the first base substrate 11.

Coating the frame sealant 50 on the color filter substrate.

Dropping liquid crystals on the array substrate.

Box-aligning the color filter substrate with the array substrate, and curing the frame sealant 50.

In the method above for fabricating the display panel, the TFT element layer 22 is fabricated above the second base substrate 21 through an exposure and development process, the black matrixes 12 and the color filter film 14 are fabricated above the first base substrate 11 through an exposure process and the planarization layer 13 is formed thereafter, the PI layers 6 are coated and cured above the surface of the TFT element layer 22 facing away from the second base substrate 21 and the surface of the planarization layer 13 facing away from the first base substrate 11, the frame sealant 50 is coated on the color filter substrate, and liquid crystals are dropped on the array substrate, and finally the CF and TFT substrate are box-aligned with each other, thus resulting in the display panel.

In some embodiments, the chemical solution includes a silver-ammonia complex solution and a reducing agent solution; forming the chemical solution for plating the isolation layer 40 includes following operations.

Adding an ammonium hydroxide to a silver nitrate solution to form a silver oxide precipitation.

Adding the ammonium hydroxide to the silver nitrate solution continually to form the silver-ammonia complex solution.

Adding a hydrazine sulfate to distilled water to form a hydrazine sulfate solution; and adding a sodium hydroxide to the hydrazine sulfate solution to form the reducing agent solution.

In the method above for fabricating the display panel, taking chemical plating of silver as an example, a chemical solution for chemical plating of silver includes a silver-ammonia complex solution and a reducing agent solution, and desirable solutions include a silver nitrate solution with a concentration of 5 g/L, an ammonium hydroxide with a concentration of 2.5 ml/L, a hydrazine sulfate solution with a concentration of 5 g/L, and a sodium hydroxide with a concentration of 2.5 g/L. The chemical solution is prepared as follows.

Firstly the silver nitride is completely dissolved in distilled water to form the silver nitrate solution with the concentration of 5 g/L.

The ammonium hydroxide is added to the silver nitrate solution slowly while stirring the solution, to form a silver hydroxide precipitation under the following chemical equation:

$$AgNO_3+NH_4OH \rightarrow Ag(OH)\downarrow+NH_4NO_3 \qquad (1).$$

Next the silver hydroxide is decomposed rapidly into a silver oxide precipitation under the following chemical equation:

$$2AgOH \rightarrow Ag_2O\downarrow+H_2O \qquad (2).$$

Excessive ammonium hydroxide is further added, and the silver oxide precipitation is decomposed by the ammonium hydroxide to form a colorless and transparent silver-ammonia complex solution under the following chemical equation.

$$Ag_2O+4NH_4OH \rightarrow 2Ag(NH_3)_2OH+3H_2O \qquad (3).$$

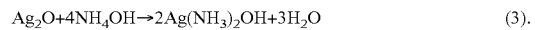

Then the reducing agent solution is prepared, where the hydrazine sulfate is added to the distilled water to form the hydrazine sulfate solution with the concentration of 5 g/L, and in order to speed up the plating of silver, an auxiliary agent of sodium hydroxide with the concentration of 2.5 g/L can be added.

Further to the method above for fabricating the display panel where the silver-ammonia complex solution is formed, in order to form the isolation layer 40, in some embodiments, plating the chemical solution onto the first substrate 10 and the second substrate 20, which are arranged opposite to each other, to form the isolation layer 40 includes following operations.

Forming a protection layer in a non-plating area of the display panel.

Spraying the reducing agent solution and the silver-ammonia complex solution onto sides of the first substrate 10 and the second substrate 20, which are arranged opposite to each other, to form the isolation layer 40, where the chemical equation is as follows:

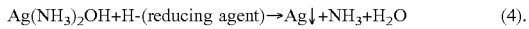

$$Ag(NH_3)_2OH+H\text{-(reducing agent)} \rightarrow Ag\downarrow +NH_3+H_2O \qquad (4).$$

Removing the Protection Layer after the Plating is Finished.

In the method above for fabricating the display panel, firstly the protection layer is formed in a non-plating area of the display panel, and the chemical solution is isolated to thereby prevent the non-plating area of the display panel from being affected during plating; then the silver is plated through spraying, where the hydrazine sulfate solution and the silver-ammonia complex solution is sprayed onto the sides of the first substrate 10 and the second substrate 20, which are arranged opposite to each other, where the silver-ammonia complex ions act with the reducing agents to reduce and deposit the silver onto the sides of the first substrate 10 and the second substrate 20, which are arranged opposite to each other, to form a dense silver layer; and finally the protection layer is removed after the plating is finished, thus resulting in the display panel. In the display panel, the water vapor can be isolated in effect from penetrating the display panel, to thereby alleviate the problem of frame Mura so as to improve the quality of an image displayed on the display panel, and the experience of a user thereof.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for fabricating a display panel, wherein the display panel comprises: a first substrate, a second substrate arranged opposite to the first substrate, and an isolation layer; wherein the isolation layer, the first substrate, and the second substrate define together a sealed chamber; and wherein a thickness of the isolation layer ranges from 0.15 μm to 10 μm, wherein the method compromises:
 box-aligning the first substrate with the second substrate;
 forming a chemical solution for plating the isolation layer; and
 plating the chemical solution onto the first substrate and the second substrate, which are arranged opposite to each other, to form the isolation layer; wherein the isolation layer, the first substrate, and the second substrate define together the sealed chamber.

2. The method according to claim 1, wherein box-aligning the first substrate with the second substrate comprises:

coating a frame sealant on the first substrate;
dropping liquid crystals on the second substrate; and
box-aligning the first substrate with the second substrate, and curing the frame sealant.

3. The method according to claim 1, wherein the chemical solution comprises a silver-ammonia complex solution and a reducing agent solution; and forming the chemical solution for plating the isolation layer comprises:
 adding an ammonium hydroxide to a silver nitrate solution to form a silver oxide precipitation;
 adding the ammonium hydroxide to the silver nitrate solution continually to form the silver-ammonia complex solution;
 adding a hydrazine sulfate to distilled water to form a hydrazine sulfate solution; and
 adding a sodium hydroxide to the hydrazine sulfate solution to form the reducing agent solution.

4. The method according to claim 3, wherein plating the chemical solution onto the first substrate and the second substrate, which are arranged opposite to each other, to form the isolation layer comprises:
 forming a protection layer in a non-plating area of the display panel;
 spraying the reducing agent solution and the silver-ammonia complex solution onto sides of the first substrate and the second substrate, which are arranged opposite to each other, to form the isolation layer; and
 removing the protection layer after the plating is finished.

5. A display panel fabricated according to the method of claim 1, comprising: the first substrate, the second substrate arranged opposite to the first substrate, and the isolation layer; wherein the isolation layer, the first substrate, and the second substrate define together the sealed chamber, and
 wherein the thickness of the isolation layer ranges from 0.15 μm to 10 μm.

6. The display panel according to claim 5, wherein the display panel further comprises a frame sealant arranged between the first substrate and the second substrate, wherein:
 the isolation layer is arranged outside of an outer side surface of the frame sealant, and defines the sealed chamber together with the first substrate and the second substrate.

7. The display panel according to claim 6, wherein the isolation layer contacts with the outer side surface of the frame sealant.

8. The display panel according to claim 6, wherein the isolation layer extends and dads a surface of the first substrate facing away from the frame sealant, and/or the isolation layer extends and dads a surface of the second substrate facing away from the frame sealant.

9. The display panel according to claim 8, wherein an orthographic projection of a part of the isolation layer, located on the surface of the first substrate facing away from the frame sealant, onto the first substrate lies in an orthographic projection of the frame sealant onto the first substrate; and/or an orthographic projection of a part of the isolation layer, located on the surface of the second substrate facing away from the frame sealant, onto the second substrate lies in an orthographic projection of the frame sealant onto the second substrate.

10. The display panel according to claim 5, wherein a material of the isolation layer comprises silver.

11. The display panel according to claim 5, wherein the thickness of the isolation layer ranges from 0.15 μm to 3 μm.

12. A display device, comprising the display panel according to claim 5, wherein the display panel comprises: the first substrate, the second substrate arranged opposite to the first substrate, and the isolation layer; wherein the isolation layer, the first substrate, and the second substrate define together the sealed chamber, and wherein the thickness of the isolation layer ranges from 0.15 μm to 10 μm.

13. The display device according to claim 12, wherein the display panel further comprises a frame sealant arranged between the first substrate and the second substrate, wherein:

the isolation layer is arranged outside of an outer side surface of the frame sealant, and defines the sealed chamber together with the first substrate and the second substrate.

14. The display device according to claim 13, wherein the isolation layer contacts with the outer side surface of the frame sealant.

15. The display device according to claim 13, wherein the isolation layer extends and dads a surface of the first substrate facing away from the frame sealant, and/or the isolation layer extends and dads a surface of the second substrate facing away from the frame sealant.

16. The display device according to claim 13, wherein an orthographic projection of a part of the isolation layer, located on the surface of the first substrate facing away from the frame sealant, onto the first substrate lies in an orthographic projection of the frame sealant onto the first substrate; and/or an orthographic projection of a part of the isolation layer, located on the surface of the second substrate facing away from the frame sealant, onto the second substrate lies in an orthographic projection of the frame sealant onto the second substrate.

17. The display device according to claim 12, wherein a material of the isolation layer comprises silver.

18. The display device according to claim 12, wherein the thickness of the isolation layer ranges from 0.15 μm to 3 μm.

* * * * *